(12) United States Patent
Miller

(10) Patent No.: US 6,322,691 B1
(45) Date of Patent: Nov. 27, 2001

(54) METHOD FOR PASSIVATING STEEL IN LARGE STRUCTURES FORMED OF STEEL-REINFORCED CONCRETE

(75) Inventor: John B. Miller, Oslo (NO)

(73) Assignee: Norwegian Concrete Technologies (NO)

( * ) Notice: Subject to any disclaimer, the term of this patent is extended or adjusted under 35 U.S.C. 154(b) by 0 days.

(21) Appl. No.: 08/255,010

(22) Filed: Jun. 7, 1994

Related U.S. Application Data

(63) Continuation-in-part of application No. 08/056,608, filed on May 3, 1993, now abandoned, which is a continuation of application No. 07/854,975, filed on Mar. 23, 1992, now abandoned.

(51) Int. Cl.$^7$ .................................................. C23F 13/00
(52) U.S. Cl. ............... 205/687; 204/196.02; 204/196.06; 204/196.36; 205/725; 205/729; 205/734
(58) Field of Search .................................. 204/130, 147, 204/148, 196, 197; 205/687, 724, 729, 734–736

(56) References Cited

U.S. PATENT DOCUMENTS 4,692,066 * 9/1987 Clear .

OTHER PUBLICATIONS

Lankard et al., "Neutralization of Chloride in Concrete", Report No. FHWA–RD–76–60, (1975), p. 1–136.*
Slater et al, "Electrochemical Removed of Chlorides From Concrete Bridge Decks", *Materials Performance*, Nov., 1976, p. 21–26.*
Manning et al., "Electrochemical Removal of Chloride Ions From Concrete; Initial Evaluation of the Pier 519 Field Trial", TRB, Jan., 1991.*

* cited by examiner

*Primary Examiner*—T. Tung
(74) *Attorney, Agent, or Firm*—Schweitzer Cornman Gross & Bondell LLP

(57) ABSTRACT

An electro-chemical process for rehabilitating steel reinforced concrete, wherein a distributed flow of electrical current is established between internally embedded reinforcing steel, connected as a cathode, and an external, distributed electrode, connected as an anode. Current flow at a rate of at least 0.1 ampere per square meter of surface area of the embedded reinforcement is continued for a time sufficient to provide a total charge of at least about 100, but not substantially more than 2000, ampere-hours per square meter of surface area of the embedded reinforcement. This results in steel with a clean surface, surrounded by concrete which is chloride free and highly alkaline. After discontinuance of the electrochemical treatment, the embedded steel slowly passivates by forming a protective surface oxide. The process is significantly more economical than known procedures, yet is reliably effective. Importantly, the process enables a large area of a structure, of possibly the entire structure, to be treated by applying the electrical charge, with increased voltage and current, to only a limited predetermined area of the structure.

6 Claims, 3 Drawing Sheets

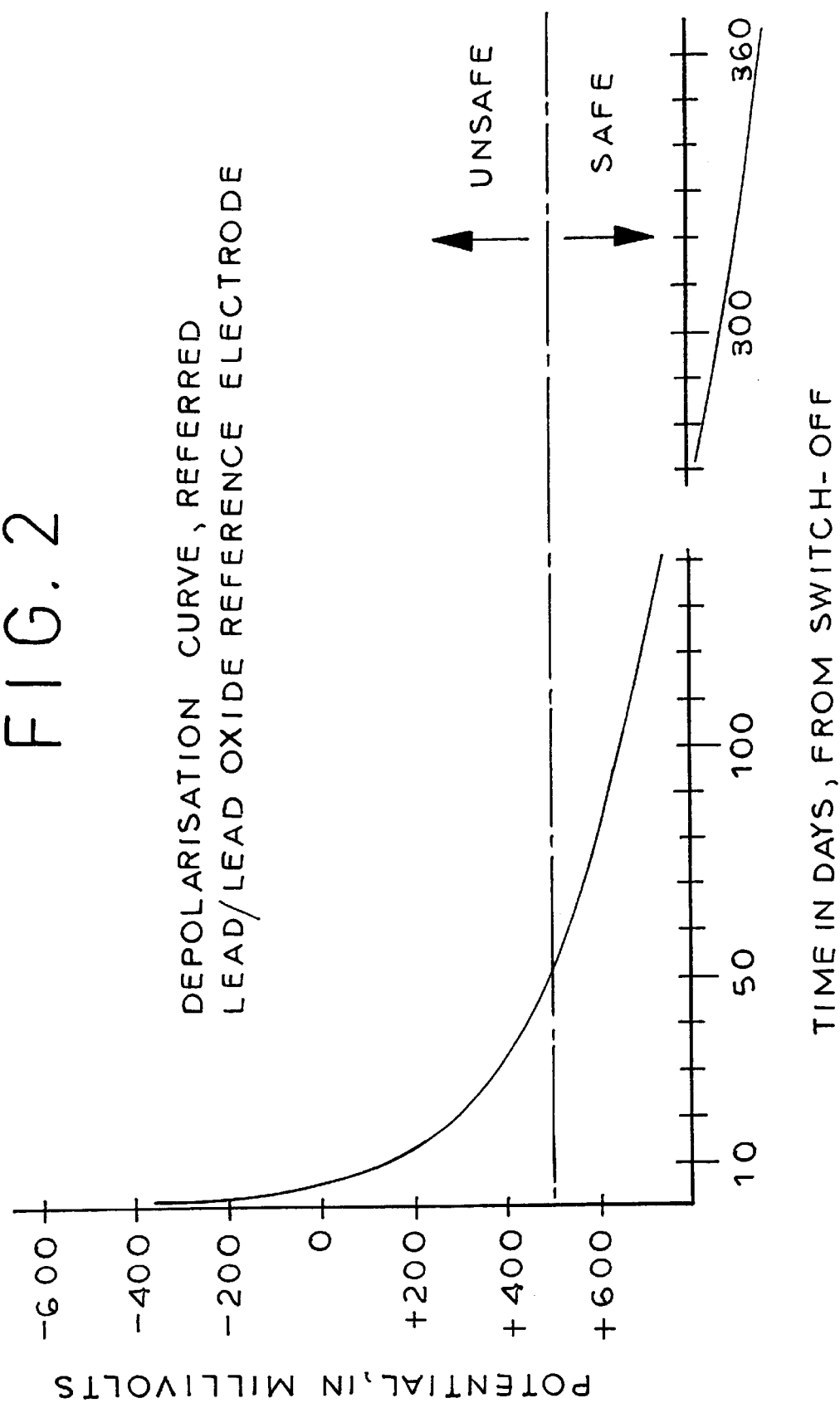

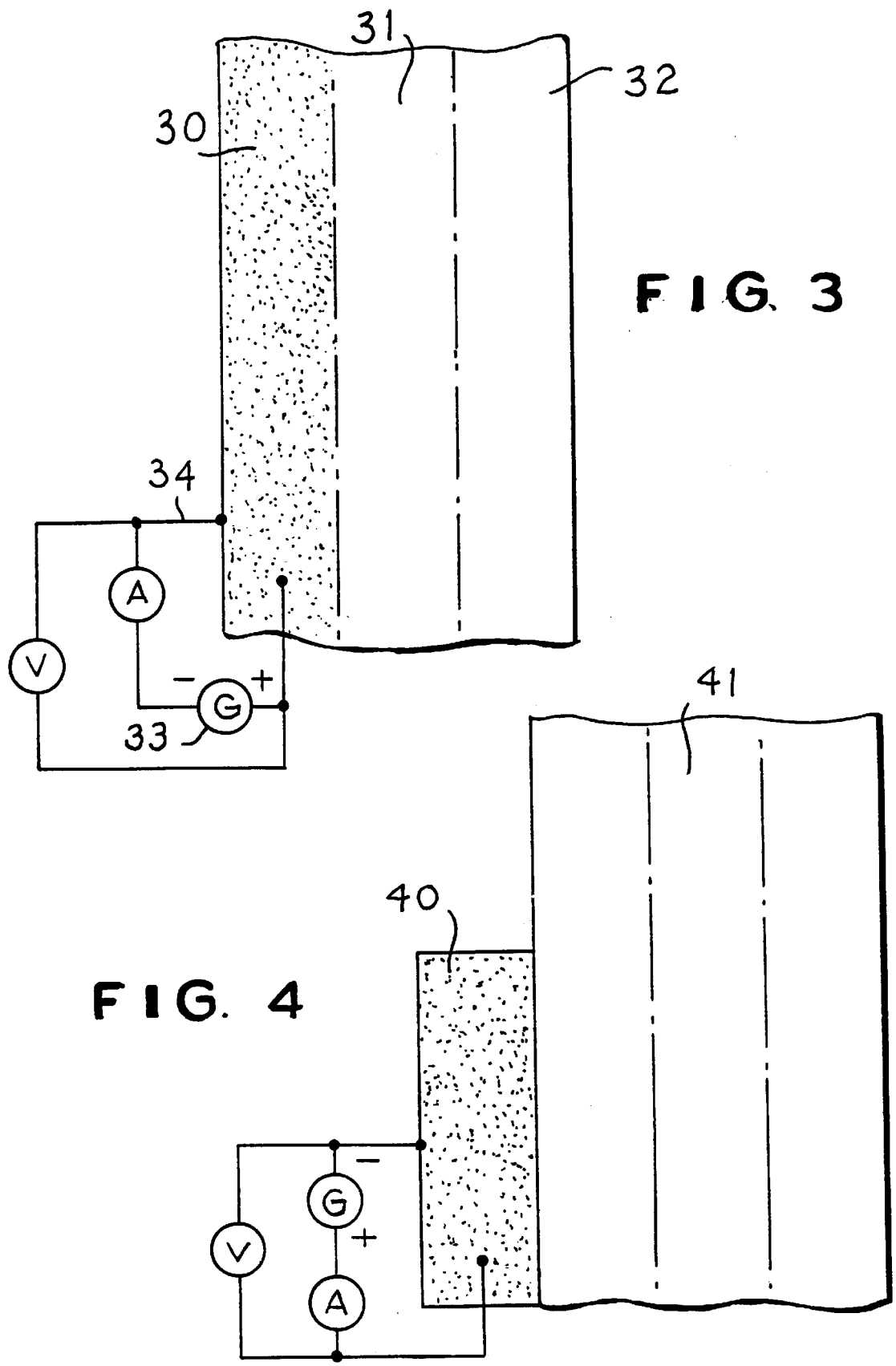

METHOD FOR PASSIVATING STEEL IN LARGE STRUCTURES FORMED OF STEEL-REINFORCED CONCRETE

RELATED CASES

This application is a continuation-in-part of my application Ser. No. 08/56,608, filed May 3, 1993, now abandoned, which is turn was a continuation of my application Ser. No. 07/54,975, filed Mar. 23, 1992, now abandoned.

BACKGROUND OF THE INVENTION

Embedded steel in reinforced concrete is normally protected against corrosion by virtue of a dense oxide film which forms on the steel surface in alkaline environments. This film acts as a barrier to aggressive agents. However, when concrete becomes contaminated with chloride ions, or when its alkalinity is reduced by absorption of carbon dioxide from the air, the passivating oxide film may break down, thus rendering the embedded steel subject to corrosion.

Much research has been done to examine the causes and mechanisms involved in the corrosion of steel reinforcement in concrete. The general consensus today is briefly that the corrosion process is electro-chemical in nature, in that sites where the passive oxide film is broken form anodes, and the surrounding areas where the film is still intact form cathodes. The anodic and cathodic areas together form corrosion cells leading to the dissolution of iron at the anodic areas.

Various electro-chemical methods have been developed in an effort to control this corrosion, or to neutralize its causes. One well known such method is that of cathodic protection whereby the embedded steel is brought to and maintained at an electrical potential at which it cannot corrode. Cathodic protection installations have been shown to be workable, but suffer from a number of adverse factors, not the least of which is their necessarily being permanent installations requiring ongoing monitoring and maintenance. Other disadvantages are high cost, the extra structural loading introduced by heavy concrete overlays, and the difficulty of ensuring correct current distribution.

Another such method is that of chloride extraction, in which chloride ions are caused to migrate under the influence of an electric field to an external electrolyte where they accumulate in, and eventually are removed with, the electrolyte. The Vennesland et al. U.S. Pat. No. 4,032,803 is an example of such processes. The chloride extraction process, though effective and less costly than cathodic protection, and thus a substantial improvement thereover, nevertheless suffers from the difficulty of predicting the time necessary for treatment to be completed. Because of this, frequent sampling and analysis of the concrete is required to determine remaining chloride levels. This difficulty is compounded by there so far being no residual chloride level which is generally accepted by the industry as being safe with regard to future chloride attack. These factors can make it difficult to calculate the cost and time necessary to reach a particular treatment target. In some cases, this time can also be unacceptably long from a practical aspect, especially since it is difficult to plan for in advance.

A third such method, which is applied to carbonated concretes, is the impregnation of the carbonated zones by the electro-migration of alkaline substances from an external source. The Miller et al. U.S. Pat. No. 4,865,702 is illustrative of this process. This latter method, though successful in carbonated concretes which are low in chloride, can become inefficient, or even fail, when the concrete contains significant amounts of ionic substances such as chlorides. Also, when the concrete contains blast furnace cement, or where pozzolans have been added to the mix, the treatment time can become unreasonably long. This is also the case when chloride accelerators have been used in the concrete mix and chlorides consequently are distributed throughout the entire concrete mass.

In practice it has been observed that it is both difficult and uneconomic, in many treatment situations, to reduce the chloride content of concrete to below about 50% of the original content. The documenting, monitoring and controlling of the chloride removal process involves the taking of numerous core samples from the concrete mass and analyzing the cores for chloride content. Concrete is a notoriously inhomogeneous material, so that statistically significant numbers of core samples need to be taken and analyzed to ensure effective monitoring of the removal process. Then, of course, the taking of each core sample leaves a hole to be filled. Similar considerations apply to the realkalization of concrete, in that drilled core samples are required for phenolphthalein testing and sodium and potassium determination.

The present invention overcomes the difficulties of the above mentioned methods by being highly predictable with regard to treatment time, by eliminating the necessity for sampling and chloride analysis, by being quicker and hence more economical to apply, and by being equally applicable to almost any kind of concrete, carbonated or not, chloride contaminated or not, pozzolanic or not, and whether or not blast furnace cement has been used.

SUMMARY OF THE INVENTION

The present invention is based in part upon the earlier discovery and recognition, as set forth in my parent applications Ser. No. 854,975 and 056,608, that the electro-chemical treatment of concrete does not have to be controlled as a function of the chloride content, for example, or as a function of the degree of carbonation. Rather, the invention of the parent applications is based upon the recognition that the electrochemical processing of concrete is optimally controlled as a function of the surface area of the embedded steel reinforcement. In a given structure, the surface area of the embedded reinforcement is either known from the construction records, or is the subject of close approximation. Electro-chemical treatment can be set up more or less in a known manner disclosed by the Vennesland et al. U.S. Pat. No. 4,032,803, or the Miller U.S. Pat. No. 5,228,959, granted Jul. 20, 1993. Significantly, however, instead of periodically taking core samples of the concrete structure to evaluate residual chloride levels, for example, the process is controlled by reference to the accumulated current flow in relation to the total surface area of the embedded reinforcing steel. The process is continued until a minimum of 100 ampere-hours of current flow per square meter of surface area of the embedded steel has been realized. The process can be discontinued at that stage (and preferably is discontinued before the current flow significantly exceeds 2000 ampere-hours per square meter of surface area of the reinforcing steel), regardless of the residual chloride levels or carbonation levels at various points in the concrete.

The process may be discontinued at this stage with a high level of confidence that the embedded reinforcing steel will be protected for a significant period of time. As compared with previously known procedures, processing according to the present invention can be accomplished with less than half the energy input and processing time.

Whereas in the process described in my parent applications, the desired number of ampere-hours of current per unit surface area of reinforcing steel was achieved by providing an electrolytic surface coating over the entire area of reinforced concrete to be treated. For practical reasons, in a large structure, it has been the practice to treat the whole of the structure on an area by area basis.

A surprising and unexpected discovery was that, under certain circumstances, a large area of a reinforced concrete structure could be treated by concentrating electrolytic treatment in only a limited area thereof. In particular, it was discovered that an entire predetermined large area could be effectively treated by concentrating electrolytic treatment upon a designated proportionately small area thereof, provided that the treatment voltages and/or currents were proportionately increased in the small area. For example, the whole of a given area can be effectively treated by directly treating one half of the area, while increasing the voltage and/or current to approximately twice the level that would otherwise be utilized to achieve a desired number of ampere-hours of current flow per unit surface area of the steel reinforcement in the entire given area. Where the treatment is applied directly to, for example, one fourth of the overall area desired to be treated, the voltage/current applied to the one fourth area is established at approximately four times the normal levels.

One potentially limiting factor in the practice of the improved process is the desirability of avoiding excessive current densities. In this respect, it is generally desirable to avoid current densities higher than about five amperes per square meter of surface area of the reinforcing steel, since detrimental side effects may arise. In appropriate cases, however, current densities much greater than that may be utilized by constructing a special treatment area, external to the primary structure and, if desired, of a temporary nature. The special treatment area incorporates reinforcing steel which has electrical continuity with the reinforcing steel of the primary structure. The special treating area is intended to be somewhat sacrificial, in that it may be subjected to what would otherwise be excessive current densities, inasmuch as the special treatment area is not a part of the principal structure.

For a more complete understanding of the above and other features and advantages of the invention, reference should be made to the following detailed description of a preferred embodiment of the invention and to the accompanying drawing.

DESCRIPTION OF THE DRAWING

FIG. 2 is a graphical representation illustrating the increasing passivity (and therefore protection) of embedded steel reinforcement over a period of time after treatment in accordance with the invention.

FIG. 3 is a schematic illustration of a three lane bridge deck, for example, in which one of the lanes is being subjected to direct treatment according to the invention at a multiple level of intensity, in order to effect treatment of all three lanes while maintaining two of the lanes in service.

FIG. 4 is a simplified representation, similar to FIG. 3, except that direct treatment is being applied to a special external area having electrical continuity with a multiple lane bridge deck, enabling indirect treatment of the bridge deck while keeping all lanes in service.

DESCRIPTION OF PREFERRED EMBODIMENT

Figure 1:
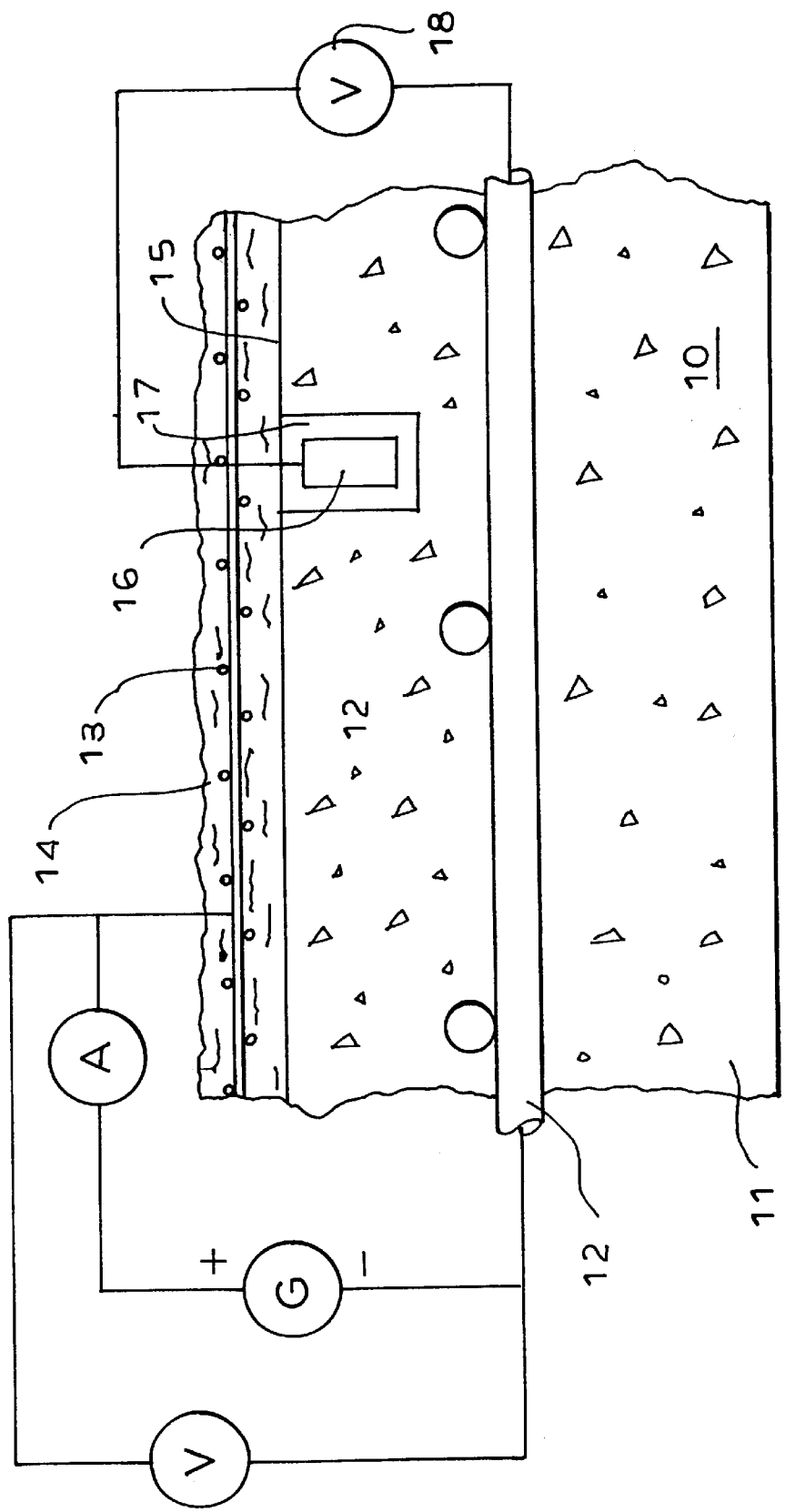
FIG. 1 is a schematic illustration of an installation of steel reinforced concrete set up for treatment in accordance with the process of the invention.

Referring now to the drawing, 10 represents a concrete structure, comprised of set and hardened concrete 11 in which is embedded steel reinforcement 12, which can be of a known and conventional type. Depending on the engineering requirements of the structure, the amount of reinforcing steel per unit of concrete may vary rather widely. For the purposes of this invention, it is assumed that the concrete structure is a mature installation, in which the body of the concrete 11 has become contaminated by chloride ions, carbonation or other circumstance tending to create conditions favoring corrosion of the reinforcing steel 11.

To carry out the process, electrical connections are made to the reinforcement steel to be protected, and to a temporary distributed anode placed externally in an electrolytic mass or liquid in contact with surface areas of the concrete to the treated. In the illustrated arrangement, a DC power source, designated by the letter "G", is connected at its positive side to a distributed electrode structure 13, arranged in electrical communication with an exposed surface area of the concrete structure 10, and at its negative side to the embedded reinforcing steel. As many connecting points as desired may be established, with the objective of realizing a relatively uniformly distributed current flow between the reinforcing steel and the distributed electrode.

To advantage, the electrode structure 13 may comprise a mesh like material of suitably conductive material, such as steel wire mesh or titanium mesh, for example. In the illustrated form of the invention, the electrode structure is embedded in an electrolytic medium 14 arranged in intimate contact with an exposed surface area 15 of the concrete structure 10.

In appropriate cases, when the surface 15 is upwardly facing and horizontal (or nearly so), the electrolytic medium can be a liquid, appropriately pooled to cover the concrete surface. More preferably, the electrolytic medium is a self-adherent conductive mass, such as a sprayed-on mixture of cellulosic pulp fiber and water or other electrolyte. The fiber mass is applied in a first layer, prior to mounting the electrode structure 13, and in a second layer thereafter, to completely embed the electrode structure within the conductive mass. A self-adherent electrolytic mass is desireable in many cases, as where the exposed concrete surface is vertical or downwardly facing, for example, or when the surface is convoluted.

Other arrangements of distributed electrode are possible, such as conductive surface coatings, foil layers placed in direct contact with the concrete surface, spongy blankets in certain cases, etc. The particular form of distributed surface electrode is not critical to the invention, as long as it functions effectively to distribute the current flow effectively over the surface area of the embedded steel reinforcement. In accordance with teachings of my parent applications, this objective is realized by distributing the current from the external distributed electrode 13 relatively uniformly over the exposed surface of the concrete structure to be treated.

In carrying out the process, a direct electric current of at least 0.1 amperes per square meter of surface area of the embedded steel reinforcement 12 is caused to flow between the reinforcement steel, which is negatively connected, and the external electrode, which is positively connected to function as an anode. The output voltage of the DC power source "G" may vary between wide limits, but it should be designed to deliver sufficient charge at the minimum current density mentioned above. In practice, it has been found convenient to use a power source "G" capable of being adjusted to between 5 and 40 Volts DC output, and with sufficient current capacity to deliver between 0.5 and 10 amperes per square meter of surface area of the embedded steel 12. The output of the power source can be monitored by suitable voltage and current meters "V" and "A" as shown.

Pursuant to the invention, the current is passed for the time necessary to give a total charge of at least about 100 ampere-hours per square meter of surface area of the embedded steel reinforcement 12. Preferably, the total charge should not exceed about 2000 ampere-hours per square meter of steel surface area, because the energy consumed is largely wasted and does not achieve a significant benefit. A total charge of as high as 10,000 ampere-hours per square meter of steel surface area can actually be detrimental, causing degradation of the concrete.

The actual time taken to achieve the desired total charge per unit of steel area will of course depend on the available DC power source and, within extremely wide limits, is not significant.

After a sufficient total charge has been passed to the embedded reinforcing steel 12, the current is switched off, the entire installation is removed, and the external conductive material, if removable, is removed. The steel will then have been given long term protection by being conditioned to become strongly passivated.

An explanation of the treatment given to the steel by the process of the present invention is as follows:

The application of a current charge at a density of not less than 0.1 ampere per square meter or surface are of the reinforcing steel results in a phenomenon known as cathodic stripping. That is to say, any existing oxide or other films present on the steel surface are completely removed leaving a perfectly clean, active steel surface. At the same time, since the steel in question is very strongly charged negatively, chloride ions, if any are present in the concrete, are strongly repelled from the steel surface. This repulsion leaves the steel surface chloride free. In addition, the surrounding concrete is also rendered essentially chloride free to a distance of usually at least 10 mm from the steel. Simultaneously, the electrochemical cathodic reactions caused by the action of the current at the steel surface lead to the production of sodium hydroxide which is produced in sufficient quantities to impregnate the pores of the concrete surrounding the steel and thus render the environment highly alkaline. These cathodic reactions are believed to be generally as follows:

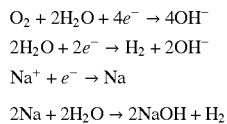

$$O_2 + 2H_2O + 4e^- \rightarrow 4OH^-$$
$$2H_2O + 2e^- \rightarrow H_2 + 2OH^-$$
$$Na^+ + e^- \rightarrow Na$$
$$2Na + 2H_2O \rightarrow 2NaOH + H_2$$

When the current is then switched off, after a suitable treatment charge has been delivered, the steel will begin to repassivate by virtue of it now being in a clean, active condition in a chloride-free, highly alkaline environment. Under these relatively ideal conditions, the steel will oxidize to produce the dense oxide film necessary to protect the steel from corrosion. This oxidation process is actually a special form of corrosion which results in the formation of the very dense protective oxide film known as the passivating film.

If desired, the formation of this film is easily followed by monitoring the electrical potential of the steel in relation to a standard reference half-cell 16, such as silver/silver oxide, lead/lead oxide, copper/copper sulphate, etc. The reference cell 16 should preferably, though not necessarily, be installed in a fixed position near the steel to be monitored, for example by grouting into a drilled hole 17 in the concrete.

A diagram can then be drawn up showing the change in potential with time, an example of which is shown in FIG. 2 of the drawings. Such a diagram will show that the passivation process, which commences as soon as the processing current is discontinued, extends over a long period of time. If the reference cell monitoring is sufficiently prolonged, it will show when the steel gains the potential commonly considered as being safe from a corrosion point of view. Indeed, if sufficiently prolonged, it can also show if the steel ever again becomes subject to corrosion, which would be indicated by the potential again passing the value associated with corrosion, but from the opposite direction.

As shown in FIG. 2, the reference potential, measured with a suitable volt meter 18, between the lead/lead oxide half cell 16 and the steel reinforcement 12, increases slowly, over a period of several months. Starting from an initial potential of about −400 millivolts, the reference potential gradually increases to about +500 millivolts (considered relatively safe, from a corrosion standpoint), in a period of around seven weeks. After a year, the reference potential has continued to increase to a level of around +700 millivolts.

It has been found in practice that the corrosion protection imparted in this way is long lived, is robust against new penetration by chloride ions, and even, surprisingly, that the corrosion protection provided eventually spreads to areas of embedded steel in concrete outside of the treated area, but in metallic contact with the steel within the treated zone, and that this occurs even after the current has been switched off and the installations removed.

With reference to FIG. 3 of the drawing, there is shown a process technique by which a structure of substantial size may be effectively treated by directly treating only a portion of the surface area thereof. In particular, FIG. 3 by way of example only, represents a section of a three-lane concrete bridge deck structure, which is desired to be treated against corrosion. In accordance with the practice of this invention, this can be accomplished by, for example, directly treating one lane 30 of the structure, while keeping the adjacent lanes 31, 32 open for traffic. The surface area of the single lane 30 is provided with an electrolytic layer, for example, in the manner shown at 14 in FIG. 1. A distributed electrode 13 (FIG. 1) is embedded in the electrolytic medium 14 and is connected to the positive terminal of a direct current generator 33. The negative terminal of the generator is connected at 34 to embedded reinforcing steel incorporated in the concrete material of the lane 30. For the improved process of the invention to be functional, the open lanes 31, 32 have electrical continuity with the treated lane 30, through common reinforcing rods and/or connections therebetween, and with similar continuity and/or connections to the concrete bodies themselves. In a typical structure, the entire three-lane structure 30–32 is of an integral construction such that electrical continuity is inherent.

Pursuant to the improved process of this invention, the voltage and current applied to the limited area of direct treatment, in this case the single lane 30, is approximately inversely proportional to the ratio of the area directly treated to that of the total structure to be treated. In the example, the lane 30 comprises approximately one third of the total area to be treated, and the voltage and current applied are approximately three times the level that would be applied for "normal" treatment applied directly to the entire area. By way of specific example, assuming that a desirable direct treatment of the entire structure would be achieved by utilizing a current density of one ampere per square meter of surface area of the steel reinforcement, treatment of the entire structure, operating directly upon only one third of the structure represented by the single lane 30, and indirectly upon the adjacent lanes 31, 32, would involve the use of current densities on the order of three amperes per square meter of surface area of the reinforcement. In a typical case, the voltages applied would have to be approximately three times "normal" voltages in order to achieve the desired higher levels current density. Current density referred to, in this respect, is with reference to the surface area of the reinforcing steel in the single lane 30 which is being directly treated, which is assumed to be consistent with that of the other two lanes.

Treatment in accordance with the process of FIG. 3 is continued until the total ampere-hours is sufficient to achieve the desired level of ampere-hours per unit surface area of the reinforcing steel of the entire three-lane structure. In the example illustrated by FIG. 3, if it is desired to achieve a current flow of, say, 1000 ampere-hours per square meter of steel surface area for the whole structure, and that normally would be accomplished by applying current at a density of one ampere per square meter for a 1000 hours, in the process of FIG. 3 the processing likewise would proceed for a 1000 hours, utilizing a current density of three amperes per square meter of steel surface area within the area 30 of direct treatment. Although the exact mechanisms for achieving the result are not fully understood, it is known that, after discontinuing the treatment of the limited area 30, the process of passivation continues over a period of weeks and months throughout the overall structure, including the adjacent lanes 31, 32 that were not subjected to direct treatment.

The specific ratios of current densities to treatment areas, as described above, are not exact and are for guidance. Optimum conditions may be affected by the particular geometry of the structure and other parameters, such as the chemical and physical nature of the concrete itself.

In the improved process of this invention, it appears possible to effect treatment of relatively large structures by applying direct treatment to relatively small areas thereof. As the areas of direct treatment become smaller and smaller fractions of the whole, the current density applied to the area of direct treatment increases generally in inverse proportion. At some point, however, the current densities can become sufficiently high as to be problematic. Preferentially, current densities should not significantly exceed about five amperes per square meter of surface area of the reinforcement steel within the area of direct treatment. Higher current densities may cause undesirable side effects resulting from, for example, excessive heat. It is possible nevertheless in appropriate cases to utilize current densities higher than five amperes per square meters by employing special extensions to the basic structure, which form areas independent of the basic integrity of the structure. For example, it is possible to construct initially, or as a later add-on, a special contiguous section 40, which is joined to a basic structure 41 (for example, a three-lane bridge deck) but is not part of the basic load-bearing structure. The special treatment area 40 has electrical continuity with the basic structure 41, by reason of utilizing common reinforcement or by having its reinforcement electrically connected to reinforcement of the basic structure 41. Likewise, the concrete mass of the treatment area 40 either has or is made to have electrical continuity with the concrete of the basic structure 41.

Treatment of the entire basic structure 41 may be achieved by proceeding as heretofore described in connection with FIG. 1 and FIG. 3, applying an electrolytic coating or mass to the surface of the treatment area 40 and imparting a voltage between the outer surface of the concrete and the internally embedded steel reinforcement. In the process as carried out in FIG. 4, the current density applied to the direct treatment area 40 is generally inversely proportional to the extent of that area in relation to the area of the basic structure 41 to be indirectly treated.

In the process as carried out in FIG. 4, not only is the entire structure effectively usable during the treating process, but the special treatment area 40 is, at least to some degree, not subject to the current density limitations that would be applicable to the process of FIG. 3, for example. In the FIG. 4 process, if an otherwise excessive current density is employed, with undesirable side effects to the treatment area 40, that may well be entirely acceptable, inasmuch as the integrity of the basic structural unit 41 is not affected.

The process of the present invention, while related in some ways to the procedures described in the before mentioned Vennesland et al and Miller patents, has surprising and unexpected advantages. In part, these are realized by controlling the processing in accordance with a predetermined current flow in relation to surface area of the embedded steel reinforcement. Extraordinary processing economies are realized and, at the same time, there is greater assurance that the protection/rehabilitation sought is effectively achieved within a targeted processing period. In a typical case, reliable results may be achieved in about half the time required to achieve a chloride level which could be regarded as reasonably safe. Processing according to the surface area of the embedded reinforcement also enables the processing time to be accurately predicted in advance, whereas controlling in accordance with remaining chloride levels of the concrete requires the periodic taking and testing of core samples from the material under treatment and cannot be predicted in advance. Moreover, by the time the testing of the core samples indicates that the chloride levels have been reduced to targeted levels, it can be expected that processing will have been carried on for a time far beyond that required to achieve ampere-hour per square meter of surface area levels known to be effective under the present invention.

As will be appreciated, concrete structures may vary widely in the amount of internal embedded reinforcement per unit of concrete. Depending upon engineering requirements, steel-to-concrete area ratios can vary between 0.2 and 2 square meters of steel surface area per square meter of concrete surface. A more typical range is between 0.3 and 1 square meter of steel surface area per square meter of concrete surface. Accordingly, it will be appreciated that controlling treating time in accordance with surface area of the reinforcing steel can lead to significantly different end result then by controlling processing time in accordance with concrete core samples.

Multiple advantages are realizable by carrying out the process of the invention by direct treatment of a contiguous area constituting only a fraction of the entire area to be treated. This is accomplished, in accordance with the invention, by utilizing voltage levels and current densities in the area of direct treatment which are generally inversely proportional to the size of the area of direct treatment to that of the area as a whole to be treated. Thus, where it otherwise would be desired to treat an entire area for 1000 hours at a current density of one ampere per square meter of reinforcing steel, treatment according to the improved process, applied directly to an area one third of the whole, proceeds by utilizing a current density of three amperes per square meter of reinforcing steel, for the same 1000 hour period. This relationship of course assumes that the density of the reinforcing steel in the area of direct treatment is generally the same as that of the balance of the structure to be indirectly treated.

Where excessive current density otherwise might be a problem, direct treatment may be applied to a specially constructed area, which is independent of the main structural integrity of the area being treated. If undesirable side effects result from the use of excessive current densities, it is a matter of little or no consequence since such side effects are limited to the special treatment area and do not detrimentally affect the main structure.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A process for electrochemical treatment of a predetermined portion of a contaminated concrete structure having an exposed surface area and embedded steel reinforcement, wherein an electroconductive material is applied to said exposed surface area of the concrete to form a distributed electrode, a source of DC voltage is applied to said electroconductive material, as a positive terminal, and to said embedded steel reinforcement, as a negative terminal, and wherein said DC voltage is applied to impart a distributed current flow, of predetermined current density in relation to surface area of the steel reinforcement, between said applied electroconductive material and said embedded steel reinforcement, and wherein said DC voltage and said distributed current flow are continued until a predetermined current flow of at least about 500 ampere-hours of current per square meter of surface area of said embedded steel reinforcement has flowed between said terminals, and wherein said treatment is terminated as a function of said predetermined current flow in relation to the surface area of said embedded steel reinforcement, the improvement characterized by (a) said electroconductive material being applied to only a predetermined fractional portion of the exposed surface area of said predetermined portion to be treated, (b) said predetermined fractional portion being less than the entire exposed surface area of said predetermined portion to be treated, (c) said distributed current flow being applied to said predetermined fractional portion at a current density which is in a ratio to said predetermined current density which is inversely proportional to the ratio of said predetermined fractional portion to the entire exposed surface area of said predetermined portion to be treated, (d) said treatment being continued until said predetermined current flow has been reached with respect to the surface area of embedded steel reinforcement for the entire said predetermined portion to be treated, and (e) said treatment being thereupon terminated as to the entire said predetermined portion to be treated.

2. A process according to claim 1, wherein (a) said DC voltage is applied at a level to impart a distributed current flow not substantially exceeding 5 amperes per square meter of surface area of the embedded reinforcement of the entire said predetermined portion to be treated.

3. A process according to claim 1, wherein (a) said treatment is discontinued before said current flow substantially exceeds 2000 ampere-hours per square meter of embedded steel reinforcement of the entire said predetermined portion to be treated.

4. A process according to claim 1, wherein (a) said treatment is discontinued before said current flow significantly exceeds 10,000 ampere-hours per square meter of surface area of embedded steel reinforcement of the entire said predetermined portion to be treated.

5. A process according to claim 1, wherein (a) said predetermined fractional portion comprises a special treatment area, (b) said special treatment area being substantially independent of load-bearing structure of the entire said predetermined portion to be treated, and having no function other than to serve as said predetermined fractional portion.

6. A process according to claim 5, wherein (a) said DC voltage is applied at a level to impart a current density greater than 5 amperes per square meter of surface area of the embedded reinforcement of said predetermined fractional portion.

* * * * *